(No Model.)

A. W. SIBLEY & J. H. COMBS.
MEAT OR BALE HOOK.

No. 364,967. Patented June 14, 1887.

Witnesses:
John Buckler
Wm. H. Weightman

Inventors:
A. W. Sibley
J. H. Combs
By A. M. Pierce
Attorney

United States Patent Office.

AUGUSTINE W. SIBLEY AND JOHN H. COMBS, OF STAMFORD, CONNECTICUT.

MEAT OR BALE HOOK.

SPECIFICATION forming part of Letters Patent No. 364,967, dated June 14, 1887.

Application filed April 21, 1887. Serial No. 235,722. (No model.)

*To all whom it may concern:*

Be it known that we, AUGUSTINE W. SIBLEY and JOHN H. COMBS, citizens of the United States, and residents of Stamford, in the county of Fairfield and State of Connecticut, have invented certain new and useful Improvements in Meat, Box, or Bale Hooks, of which the following is a specification.

Our invention relates especially to devices employed for handling meat, freight, &c., and has for its object the provision of a hook cheap and simple to construct, strong, and not liable to break easily, and which will not injure the hand of the user.

To attain the desired end, our invention consists, essentially, in a hook of the usual shape and of any desired size, the shank whereof engages with an arm formed with or upon a ferrule. The manipulating-handle is made in two parts or sections, the said sections engaging with the ferrule at each side thereof, the surface of the handle being flush with the periphery of the said ferrule, all of which will be hereinafter first fully described, and then pointed out in the claims.

Figure 1:
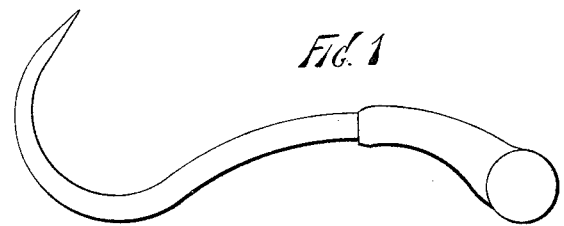
Figure 2:
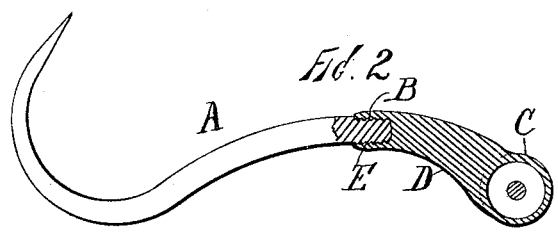
Figure 3:
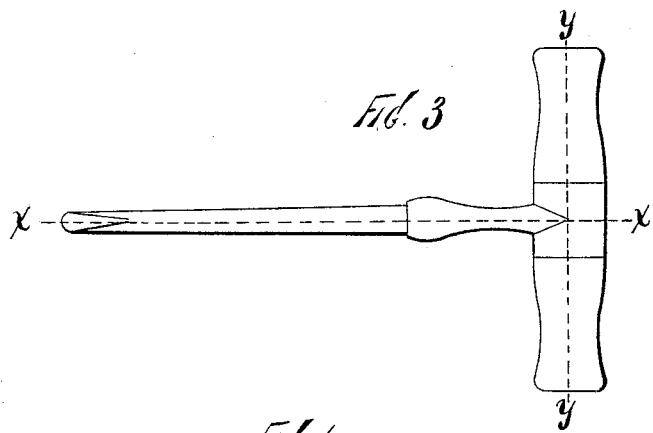
Figure 4:
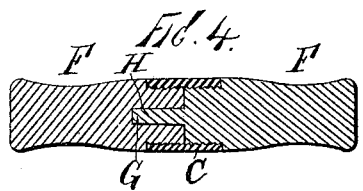

In the drawings, Figure 1 is a side elevation of my device. Fig. 2 is a partial sectional view at line $xx$ of Fig. 3. Fig. 3 is a plan view. Fig. 4 is a sectional view at line $yy$ of Fig. 3.

Like letters of reference, wherever they occur, indicate corresponding parts in all the figures.

A is the hook, the shank thereof being shown as screw-threaded at B.

C is a ferrule made preferably of malleable iron, said ferrule being formed with an arm, D, provided with a threaded socket, E, for receiving the shank of the hook. F F are the two sections of the handle, arranged to engage with the ferrule, as particularly illustrated in Fig. 4. In order to give additional stability, we form a socket in one of the sections of the handle, as at H, and provide the other section with a dowel, G, which enters said socket H.

As heretofore constructed hooks of this character have been in two parts, a metal hook and shank, said shank being formed into an eye encircling the handle, or else the shank of the hook passed through the handle, and was riveted or battered down to hold it in place. These constructions have several disadvantages. When the metal was formed in an eye, the ridge formed around the handle thereby injured the hand of the user, preventing a firm grasp, and when the shank of the hook passes through the handle it greatly weakens the same. By my construction these difficulties are overcome, the outer surface of the ferrule being flush with the surface of the handle, a firm grasp may be had, and the hand will not be injured.

We have shown the shank of the hook as screw-threaded, said thread engaging with the arm upon the ferrule; but the socket in the arm might be made square and the hook-shank held therein by a rivet, if desired. We have also shown the ferrule as screw-threaded, and the sections of the handle also threaded to engage therewith; but the screw-threads might be dispensed with and the sections of the handle driven into the ferrule, and these deviations in construction might be made without departing from the spirit of our invention.

Having now fully described our invention, what we claim as new therein, and desire to secure by Letters Patent, is—

1. A device of the character herein specified, consisting of a hook, the shank whereof engages with a combined arm and ferrule, and a handle made in two sections, each being secured within said ferrule, substantially as shown and described.

2. The hook A, screw-threaded at B, ferrule C, provided with arm D, and having the threaded socket E, and handle-sections F F, one of said sections bearing a dowel, G, and the other section having a socket, H, for the reception of said dowel, the whole device combined and arranged substantially as shown and described.

Signed at Stamford, in the county of Fairfield and State of Connecticut, this 18th day of April, A. D. 1887.

AUGUSTINE W. SIBLEY.
JOHN H. COMBS.

Witnesses:
ABRAHAM R. HOLLY,
CHARLES E. HOLLY.